Patented Mar. 20, 1934

1,951,984

UNITED STATES PATENT OFFICE 1,951,984

RECOVERY OF PHOSPHORUS FROM DILUTE GASES

Friedrich P. Kerschbaum, Winter Haven, William H. Waggaman, Lakeland, and Stapleton D. Gooch, Lake Wales, Fla., assignors, by mesne assignments, to Pembroke Chemical Corporation, a corporation of Florida No Drawing. Application May 20, 1931,
Serial No. 538,874

8 Claims. (Cl. 23—223)

This invention relates to the production of phosphorus and more particularly to the pyrolytic reduction of phosphates, and is a continuation in part of prior application Serial No. 494,442, filed November 8, 1930.

There are now two general methods employed in recovering phosphorus by the pyrolytic method. The first method comprises volatilizing the phosphorus in an electric furnace, under reducing conditions, from a phosphate silica charge. The second method comprises the displacement of phosphorus from its compounds by heating the mixture of phosphate, silica and fuel in a blast furnace.

In each method it is necessary to remove the phosphorus from the furnace gases. When phosphorus is volatilized by utilizing a blast furnace the recovery of the phosphorus from the effluent gases is considerably more difficult than the recovery from electric furnace gases. In the blast furnace operation high temperature is required and is generated by the combustion of the carbon or other fuel mixed with the charge. This is usually done by forcing preheated air into the mass. The effluent gases, therefore, contain phosphorus in relatively high dilution. This dilution is due to the large quantities of carbon monoxide, nitrogen, etc., produced by the combustion of the fuel. In the usual operations the effluent gases seldom contain over one and one-half grams of phosphorus per unit of effluent gases at normal temperature and pressure.

It has generally been supposed that in order to remove phosphorus from gases dilute with respect to this element it is necessary to conduct the gases through a condensing system of relatively large dimensions in order to insure a low velocity of flow and a period of time long enough to insure complete precipitation or condensation of phosphorus. We have found, however, that phosphorus may be recovered from gases containing this element by utilizing a much smaller condensing system than was heretofore thought necessary, and that the phosphorus may be recovered in a concentrated and liquid form.

A major object of the present invention is to provide a new method of recovering phosphorus from furnace gases and is particularly, although not exclusively, applicable to the recovery of phosphorus evolved by the blast furnace method.

Another object is to provide a novel method for recovering phosphorus in liquid form from the gases issuing from phosphorus volatilization furnaces.

Yet another object is to effectively remove phosphorus from gases which are dilute with respect to this element without employing complicated apparatus.

A further object is to remove phosphorus from gases in a continuous liquid form as distinguished from an emulsion or sludge.

With these and other important and related objects, the invention comprehends the concept of volatilizing phosphorus from phosphorus containing compounds and condensing the phosphorus under controlled conditions of temperature, acidulation and time of contact.

The present invention is an improvement upon the general type of process described in copending application 494,442 filed November 8, 1930. As was described in that application, phosphorus may be recovered from phosphatic material by mixing the phosphatic material with the required amount of siliceous material and coke and smelting this in a blast furnace. The gases of combustion, together with the elemental phosphorus, may be passed through a series of condensers in which the gases are subjected in each condenser to a spray or stream of recirculated aqueous medium and in which the temperature of the aqueous medium in the several condensers is successively stepped down. It is also pointed out in the prior application that the precipitation or coagulation of the phosphorus may be accelerated by adding an electrolyte to the wash water.

In further extensive experimentation upon this general type of process we have found that unexpected improved results are obtained by controlling the acidity of the aqueous medium. We have found that when the condensing aqueous medium is maintained at an acidity equivalent to not less than a tenth normal the phosphorus is recovered in a concentrated or continuous form as distinguished from a sludge or an emulsion. When phosphorus is recovered as a sludge or emulsion it is very difficult to separate or segregate the water and impurities from the phosphorus, and handling of the phosphorus in the sludge or emulsion form is very difficult.

While not limiting ourselves to any theory of reaction, it appears that the acid solution not only tends to flocculate and cause precipitation of phosphorus but, in addition, it tends to dissolve certain solid impurities which otherwise tend to adhere to the phosphorus particles and prevent their coalescense into a coherent mass. By the present method, that is by contacting the phosphorus containing gases with an aqueous medium of predetermined acidity, the phosphorus particles are precipitated and certain solid impurities are dissolved so that the agglomerations of the phosphorus particles into a continuous liquid or solid mass is facilitated.

In further experimentation upon this subject we have found that within certain ranges the acid concentration is very important. We have found, for example, that in order to obtain improved results it is necessary that the acidity of the wash solution be equivalent to not less than one-tenth normal. It is often desirable, however, in practice to increase this acidity to a considerably higher value, and within limits an increase in acidity facilitates the precipitation of the phosphorus and aids subsequent collection in liquid form. Under some operating conditions this acidity may well rise to the acid of a normal solution or even higher without undesirably affecting the quality of the phosphorus collected. As a general rule the higher acidity facilitates the precipitation of liquid phosphorus.

In actual practice however we prefer to maintain the acidity at about one-third normal. It is found that this concentration is quite effective in causing the phosphorus to settle out in liquid form but is not corrosive on the equipment as are higher concentrations. Therefore, while it is perfectly feasible to operate at higher acid concentrations, we prefer, for reasons of operating economies, to utilize concentrations ranging from one-tenth normal to one-third normal.

In carrying out the process, gases issuing from the blast furnace are first preferably passed through the dust catcher, of any suitable or conventional design, and then through a series of condensing stages. Preferably three separate condensing units are employed, although it is to be clearly understood that separate condensing stages may be embodied in the single condensing element.

The condensers employed may consist of a cylindrical chamber of considerably greater height than diameter which is closed at the top and provided at this section with a gas drawoff. The bottom of the condenser is preferably immersed below the level of a body of aqueous medium contained in a trough or receptacle to form a liquid seal and to provide a vehicle for the collection of the phosphorus condensed within the element. If desired, the condenser unit may comprise a bubble tower construction having a series of vertical pans provided with downcomers and risers so that the inflowing gases contact intimately with the cooling medium flowing downwardly and countercurrently with respect to the gases.

The furnace gases are admitted to the condenser through the suitable inlet line positioned on the side and near the bottom but above the liquid level of the seal. In passing upwardly in the first condenser the gases are contacted with a recirculating acidulated aqueous medium maintained at a temperature above the melting point of phosphorus and preferably above 100° F. This aqueous medium is circulated to and from the condenser and its temperature may be controlled to any desired value. We have found that by maintaining the temperature of this condensing medium at or above the melting point of phosphorus the bulk of the phosphorus in the first condenser is readily liquefied and can be pumped out in liquid form without difficulty. This fact markedly distinguishes the present process from earlier methods in which the phosphorus when recovered was in the form of difficultly workable sludge or as a difficultly separated emulsion. If, however, the acidity is allowed to fall below the minimum stated, the phosphorus recovered, instead of being in liquid form, is in the form of a sludge which is very difficult to work up into a readily marketable form.

The gases issuing from the first condenser may be passed to a second condenser of similar construction in which an acidulated aqueous medium is recirculated. In this second condeser the acidity of the wash solution is similarly maintained at a minimum value equivalent to one-tenth normal solution. If desired the temperatures of the wash solution in the second condenser may be maintained above the melting point of phosphorus to recover further amounts of this element in coherent liquid form from the gases. On the other hand, if desired, the temperature of the aqueous medium may be maintained at a lower value, as for example between 90° and 100° F. This second lowering of the temperature of the gas, achieved in the second condenser, further reduces the vapor pressure of the phosphorus and as a result a large portion of the phosphorus which was maintained in vapor form in the first condenser is transformed into a liquid or solid form, depending upon the temperature of condensation, and may be recovered from the second chamber.

If desired the evolved gases may then be passed to a third condenser wherein they are again subjected to the cooling action of a recirculating stream or spray of acidulated aqueous medium maintained at an acidity equivalent to not less than one-tenth normal and at a desirably low temperature.

It will be appreciated that the size and number of the condensing units may be considerably varied. In lieu of using a number of small condensers and recirculating this acidulated aqueous medium in each unit, the process may be carried out by eliminating one or more condensers and by increasing the quantity or rate of flow of the acidulated recirculating medium in the condensers employed. We have found in practice, however, that a very high recovery of the phosphorus content of the evolved gases may be secured by utilizing a condensing stage comprising three separate condensers in which the temperatures are progressively stepped down and in which the gas stream in each condenser is contacted with the acidulated recirculated stream of an aqueous medium maintained at predetermined temperatures.

The acidity mentioned hereinbefore is preferably obtained by proportioning the ingredients of the charge in the furnace so that the acid is formed from the gases evolved in the furnace; in these circumstances the acids employed will comprise chiefly compounds of fluorine, such as hydrofluosilicic acid. If, however, the gases do not contain sufficient acid forming ingredients to produce the desired acidity in the condensing medium or if it is not desired to control the quantity of acid forming constituents in the charge, the acidity may build up by adding one or more acids to the condensing medium until the titration reaches the desired point.

The phosphorus which is separated in liquid form in the first condensing unit may be withdrawn from the system. The phosphorus recovered in the subsequent condensing stages, if in sludge form, may be withdrawn and pumped to a receptacle where it is either reduced to the liquid form or it may be delivered as a wet sludge to a phosphorus burner and burned to P₂O₅ and condensed to phosphoric acid as described in copending application Serial No. 433,185, filed March 4, 1930. The pure liquid phosphorus may be employed directly in the production of phosphoric acid or may be shipped as such.

While we have described a preferred embodiment of the invention, it is understood that this is given merely as exemplifying the underlying principles of the invention and not as an exclusive method of effectuating these principles. It is pointed out that the acidity may be varied through relatively wide ranges but should, as noted, be maintained above a certain predetermined minimum. The acidity may be obtained as described either by adjusting the ingredients of the charge or by directly adding a sufficient amount of an acid to the recirculating medium.

We claim:

1. A process of removing phosphorus from gases relatively dilute in this element which comprises contacting the gases with an acid solution, the acidity of which is between a tenth normal and a normal solution.

2. A process of recovering phosphorus from blast furnace gases comprising passing the gases through a condenser and contacting them therein with an acid solution having an acidity of substantially third normal.

3. A process of recovering phosphorus from gases relatively dilute in this element which comprises contacting the gases with an acid solution of between tenth normal and normal concentration.

4. A process of preparing phosphorus comprising volatilizing phosphorus from its compounds by pyrolytic decomposition of a phosphate silica charge, contacting the phosphorus bearing gases evolved with an aqueous solution of an acid, the concentration of which varies between one-tenth normal and one-third normal, and regulating the proportion of materials undergoing pyrolytic decomposition to maintain the concentration of the acid solution.

5. A process of preparing phosphorus which comprises volatilizing phosphorus from its compounds by pyrolytic decomposition and contacting the phosphorus bearing gases with an inorganic acid solution, the acidity of which is approximately one-third normal.

6. A process of recovering phosphorus from blast furnace gases comprising passing the gases through a condenser and there contacting it with a recirculated stream of an acidulated aqueous medium in which the acidulation is effected by mineral acid, the acidity of the solution being between one-tenth normal and normal.

7. A process of recovering phosphorus from blast furnace gases comprising serially passing gases through a series of condensing units and spraying the gases in each unit with an inorganic acid solution of a concentration from normal to decinormal.

8. A process of recovering phosphorus from blast furnace gases which comprises passing gases through a series of condensers, separating the gases in each condenser with a mineral acid solution maintained at concentration of from one-tenth normal to normal, recirculating the solution in each condenser and maintaining the solution in each successive condenser at progressively lower temperatures.

FRIEDRICH P. KERSCHBAUM.
WILLIAM H. WAGGAMAN.
STAPLETON D. GOOCH.